United States Patent Office 3,562,296
Patented Feb. 9, 1971

3,562,296
TETRAHYDROPYRANYL DERIVATIVES
Paul R. Stapp and Clarence R. Bresson, Bartlesville, Okla., assignors to Phillips Petroleum Company, a corporation of Delaware
No Drawing. Filed Nov. 15, 1967, Ser. No. 683,154
Int. Cl. C07d 7/04
U.S. Cl. 260—345.1                   5 Claims

ABSTRACT OF THE DISCLOSURE

Aromatic compounds, such as, for example, benzene and naphthalene, are reacted with halotetrahydropyrans in the presence of a Lewis acid alkylation catalyst such as, for example, aluminum chloride, to yield aryl-tetrahydropyrans.

---

This invention relates to the reaction of aromatic compounds with halotetrahydropyrans to form aryltetrahydropyrans. In another aspect, this invention relates to novel aryltetrahydropyran compounds. In still another aspect, this invention relates to novel plasticized blends of organic polymers.

Various methods for synthesizing phenyltetrahydropyrans are known in the art. For example, it is known that 2-phenylpropene will react with formaldehyde and sulfuric acid to form a phenyldihydropyran derivative which can be hydrogenated to form 4-phenyltetrahydropyran. It is also known that styrene can be reacted with acrolein to yield 2-phenyl-3,4-dihydro-2-[H]-pyran which, in turn, can be hydrogenated to 2-phenyltetrahydropyran. Another known process is the reaction of tetrahydro-4-pyrone with phenylmagnesium bromide to yield 3-phenyl-3-hydroxy tetrahydropyran which is reacted in the presence of heat and acetic anhydride to yield a phenyldihydropyran intermediate which, in turn, is hydrogenated to 4-phenyltetrahydropyran.

The above reactions, which are illustrative of the prior art processes for producing aryltetrahydropyrans, involve the use of rather delicate reaction mechanisms, expensive reagents, and a hydrogenation step. There is needed a one-step process for directly converting a mixture of aryl compounds and tetrahydropyran compounds to aryltetrahydropyran products.

One object of this invention is to provide an improved process for producing aryltetrahydropyrans.

Anther object of this invention is to provide novel aryl tetrahydropyran compounds.

Still another object of this invention is to provide improved plasticizers for organic polymers and novel plasticized organic polymer blends.

According to one embodiment of this invention, we have found that certain halotetrahydropyran compounds can be reacted with certain aryl compounds in the presence of Lewis acid alkylation catalysts to form aryltetrahydropyran compounds.

According to another embodiment of this invention, novel aryltetrahydropyran compounds are provided.

According to still another embodiment of this invention, we have found that the above aryltetrahydropyran compounds are useful plasticizers for organic polymers such as, for example, poly(vinyl chloride).

The halotetrahydropyran compounds which can be utilized according to this invention have the general formula:

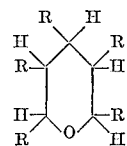

wherein one R radical is a halogen, e.g., chlorine, fluorine, bromine, or iodine, and the other R radicals are selected from hydrogen, and alkyl or cycloalkyl radicals having to and including 17 carbon atoms, and wherein the total carbon atoms of the alkyl and cycloalkyl radicals does not exceed 20 carbon atoms per molecule.

The halotetrahydropyran materials employed in this invention can be prepared by any means known in the art. Particularly preferred are the 4-halotetrahydropyrans described by the above generic formula. A preferred method of preparing the 4-halotetrahydropyrans is the reaction of a terminal olefin, paraformaldehyde, and a hydrogen halide at a temperature within the range of from −150 to 250° C.

Examples of suitable halotetrahydropyran compounds include 4-chlorotetrahydropyran, 3-amyl-4-chlorotetrahydropyran, 3-nonyl - 4 - chlorotetrahydropyran, 3-heptyl-4-chlorotetrahydropyran, 3 - methyl - 4 - chlorotetrahydropyran, 4-bromotetrahydropyran, 4-iodotetrahydropyran, 4-fluorotetrahydropyran, 2-bromotetrahydropyran, 3-chlorotetrahydropyran, 3-heptadecyl-4-chlorotetrahydropyran, 2-propyl-3-heptadecyl-4-bromotetrahydropyran, 2-chloro-3 - (4 - methyl - 5 - ethyloctyl) - 4 - cyclohexyl - 6 - propyltetrahydropyran, 2-cyclododecyl-4-chloro-6-cyclohexylethyl(tetrahydropyran, 2 - methyl-3-chloro-5-(4-propylcyclodecyl-ethyl)tetrahydropyran, and the like.

The aryl compounds that are used according to this invention have a general formula selected from

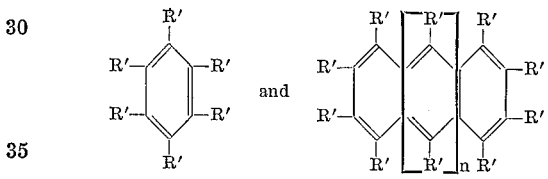

and wherein n is 0, 1, or 2; wherein R' is hydrogen, or hydrocarbon radicals selected from aryl, cycloalkyl, and alkyl, and combinations thereof, having up to and including 12 carbon atoms; and wherein up to three of said hydrocarbon radicals are attached to each aryl molecule. In one preferred embodiment of this invention, at least one of said hydrocarbon radicals is attached to each aryl molecule. These aryl compounds can be produced by any method known in the art.

Examples of suitable aryl compounds that can be used according to this invention include benzenes, toluene, naphthalene, ethylbenzene, propylbenzene, naphthacene, 1,5,11-tribenzylnaphthacene, 1-methyl-6-cyclododecyl-12-phenylnaphthacene, 2-dodecyl-5-cyclododecyl - 9 - [cyclohexyl(6-hexyl)]naphthacene, biphenyl, anthracene, 1-benzylanthracene, cyclohexylpropylbenzene, 1-(3-pinanyl)-naphthacene, 1,4-diethylbenzene, 3,3-dimethylpentylbenzene, p-terphenyl m-terphenyl, dodecylbenzene, 1,5-didodecylnaphthalene, 1 - dodecyl-4-(3-methyl-4-propyloctyl)-5-cycloheptylethylnaphthalene, p-xylene, methyl-3-ethylbenzene, and the like.

The Lewis acid alkylation catalyst of this invention can include any Friedel-Crafts type catalysts known to be useful for conventional Friedel-Crafts alkylation of aromatic type compounds. Examples of such catalysts include aluminum chloride, boron fluoride, hydrogen fluoride, sulfuric acid, stannic chloride, zinc chloride, ferric bromide, antimony pentachloride, iodine, phosphoric acid and the like. We particularly prefer to employ metallic halide Friedel-Crafts catalysts such as aluminum chloride. Sufficient alkylation catalysts should normally be employed to effect the conversion within a practical reaction time. The particular amount to be employed will, of course, vary with the particular catalyst employed and also with other conditions of the conversion. Normally, we prefer to employ in the range of 1.01 to 5 moles of such catalyst for each mole of halotetrahydropyran. However, such catalyst can be employed in the range of 0.0001 to 10 moles of catalyst per mole of halotetrahydropyran. The lower amounts of catalyst are employed more successfully at the higher conversion temperatures.

Normally, it is preferred to employ a molar excess of the aryl compounds in relation to the halotetrahydropyran compounds. Particularly, it is preferred to employ in the range of about 1 to about 20 moles of aryl compound for each mole of halotetrahydropyran compound. The optimum ratio of aryl compound to halotetrahydropyran compounds will vary with the particular compounds and conditions employed. Optimums for each particular set of conditions can readily be determined by one skilled in the art.

The conversion process of this invention can be effected in conventional equipment by conventional techniques. Temperatures in the range of about 0 to about 300° C. can be employed. However, temperatures in the range of about 30 to about 70° C. are preferred. Either superatmospheric or subatmospheric pressures can be employed in the range of 0.1 to 100 atmospheres; however, normally, atmospheric pressures are preferred because of convenience. The reaction can be effected for a sufficient time to carry out the degree of conversion desired. Normally, reaction times in the range of about five minutes to about 48 hours are suitable.

If desired, diluents can be present in the reaction zone. For example, any diluent that does not deleteriously affect the conversion can be employed. The amount of diluent will generally range from about 1 to about 90 weight percent of the reactor contents. Examples of suitable diluent materials include cyclic and acyclic saturated hydrocarbon compounds such as hexane, pentane, dodecane, cyclohexane, and the like. Normally, the reaction is run substantially completely in the absence of water, or other polar compounds such as alcohol, aldehydes, and the like.

It is believed that all of the products of the above-described process are novel except the phenyltetrahydropyrans. Examples of these novel compounds include 4-(p-tolyl)tetrahydropyran, 4-(4-biphenylyl)tetrahydropyran, 4-(2-naphthyl)tetrahydropyran 3-(2-anthryl)tetrahydropyran, 3-(2,4-xylyl)tetrahydropyran, 2-mesityltetrahydropyran, 4-(2-naphthacenyl)tetrahydropyran, 4-[4-(3,3-dimethylpentyl)phenyl]tetrahydropyran, 4 - [2-(1,5,11-tribenzyl)naphthacenyl]-tetrahydropyran, 3-heptadecyl-4-[1-(2 - dodecyl- 5- cyclododecyl- 9 -cyclohexyl)naphthacenyl tetrahydropyran, 3 - dodecyl-4-phenyltetrahydropyran, 3-methyl- 4 -(p-tolyl)tetrahydropyran, 3-propyl-4-(2-,4-xylyl)tetrahydropyran, -3-ethyl-4-(4-dodecylphenyl)tetrahydropyran, and the like.

The aryltetrahydropyran compounds that are products of the process of this invention are generally useful as bactericides, fungicides, pesticides, herbicides, selective solvents, and plasticizers for organic polymers. Any organic polymer wherein plasticizing agents are conventionally employed for improvement of its properties is benefited by the employment of the products of the processes of this invention. The aryltetrahydropyran products can be employed as plasticizer components of polymer blends, in amounts in the range of about 0.01 to about 80 weight percent of the total polymeric blend. Preferably, the aryltetrahydropyrans are employed in the range of about 1 to about 60 weight percent of the total polymeric blend. Other additives can be included in these polymeric blends. Examples of such other additives include conventional plasticizers, stabilizers, pigments, and the like.

Examples of organic polymers that can be plasticized wth the products of this invention include homopolymers and copolymers of 1-olefins such as polyethylene, polybutene-1, polypropylene, ethylene-butene-1 copolymer and other polymers such as polystyrene and the poly(vinyl halides). Poly(vinyl chloride) is particularly benefited by the employment of the products of this invention as plasticizers therefor.

Any of the aryltetrahydropyran compounds, or mixtures thereof, with or without other known plasticizers and conventional additives can be incorporated into the organic polymers by any conventional means such as blending, milling, or rolling processes in which, for example, a Banbury mixer or heat roll mill is used. Generally, mixing temperatures are at least as high as the softening point of the polymers.

The following examples illustrate the invention in better detail, but are not to be construed as limiting the invention.

EXAMPLE 1

To a stirred reactor were charged 53.4 parts by weight of anhydrous aluminum chloride and 176 parts by weight of dry benzene. Over a period of twenty minutes, a solution of 42.2 parts by weight of 4-chlorotetrahydropyran and 43.9 parts by weight of dry benzene was added slowly to the stirred reactor. During the addition of the 4-chlorotetrahydropyran solution, the reactor contents warmed due to the exothermic nature of the reaction, and cooling was effected to maintain the temperature in the range of about 40 to 50° C. Upon completion of the addition of the 4-chlorotetrahydropyran, the reaction mixture was stirred for an additional hour at room temperature. The reactor contents were poured over ice and the benzene was removed. A light yellow solid crystallized and was extracted with ether. The ether solution was dried with sodium sulfate, and the ether was removed to yield a crystalline solid which was subsequently recrystallized from aqueous ethanol to yield the product, 4-phenyltetrahydropyran.

A total of 51.5 parts by weight of product was recovered which constituted a yield of 91 mole percent based upon the 4-chlorotetrahydropyran charged. The purified 4-phenyltetrahydropyran product, as recrystallized from aqueous ethanol, was noted to be in the form of colorless platelets and to have a melting point of 48–49° C. Elemental composition calculated for 4-phenyltetrahydropyran ($C_{11}H_{14}O$) is: 81.5 percent carbon and 8.6 percent hydrogen. Elemental composition found by analysis of the product was 81.2 percent carbon and 8.7 percent hydrogen. A nuclear magnetic resonance spectrum was consistent with the assigned structure.

EXAMPLE 2

Toluene was reacted with 4-chlorotetrahydropyran under conditions and following the procedure as in Example 1. The product formed upon pouring the reactor contents over ice was washed with water, dried with sodium sulfate, and distilled. The reaction product, 4-(p-tolyl)tetrahydropyran, was recovered as a colorless oil that had a boiling point of 88–90° C. at 0.7 millimeter of mercury. A total of 86.9 parts by weight of product was recovered which constituted a yield of 77.4 mole percent based on the 4-chlorotetrahydropyran charged. Elemental composition calculated for 4-(p-tolyl)tetrahydropyran ($C_{12}H_{16}O$) is 81.8 percent carbon and 9.1 percent hydrogen. Elemental composition of the product by experimental analyses is 81.8 percent carbon and 9.1 percent hydrogen. Gas-liquid chromatography of the product determined it to be comprised of substantially one compound. Infrared analysis data were consistent with data to be expected for the structure of 4-(p-tolyl)tetrahydropyran.

Examples 1 and 2 above, clearly demonstrate the process of this invention, the conversion of aryl compounds to tetrahydropyranyl derivatives thereof by reaction with a halotetrahydropyran compound in the presence of a Lewis acid alkylation catalyst.

EXAMPLE 3

Geon 101 resin (trademark, B. F. Goodrich Co.) poly (vinyl chloride) resin was blended with 4-(p-tolyl)tetrahydropyran and with additives of the prior art in a series of runs in accordance with the following recipe.

Phr. (parts per 100 of resin)

| | |
|---|---|
| Geon 101 (trademark) | 100 |
| Plasticizer | 50 |
| Mark M (Ba-Cd stabilizer) | 2 |
| Thermolite-31 (organo tin stabilizer) | 1 |
| Stearic acid (lubricant) | 0.5 |

Upon blending, the plasticized polyvinyl chloride formulations were milled, compression molded to sheets, and tested; as is presented by the following table.

TABLE I

| Primary plasticizer | Durometer ASTM D-1706 instant, 10 sec. | Tens. brk., p.s.i. ASTM D-412 | Elongation break, percent ASTM D-412 | 100% mod., p.s.i. ASTM D-412 |
|---|---|---|---|---|
| 4-(p-tolyl)tetrahydropyran. | 96;87 | 3,290 | 258 | 2,117 |
| Dioctyl phthalate | 89;82 | 2,880 | 372 | 1,528 |
| Dibutyl phthalate | 79;73 | 2,650 | 370 | 1,073 |

These data demonstrate that the tetrahydropyran compounds produced by the process of this invention as exemplified by 4-(p-tolyl)tetrahydropyran effectively plasticize polyvinyl chloride. The plasticization effected compared favorably with that effected by commercial plasticizers such as dioctyl phthalate and dibutyl phthalate.

EXAMPLE 4

Formulations of Geon 101 (trademark) poly(vinyl chloride) polymer were prepared in accordance with the following recipe.

Phr. (parts per 100 of resin)

| | |
|---|---|
| Geon 101 (trademark) | 100 |
| Dioctyl phthalate | 40 |
| 4-phenyltetrahydropyran | 10 |
| Mark M (Ba-Cd stabilizer) | 2 |
| Thermolite-31 (organo tin stabilizer) | 1 |
| Stearic acid (lubricant) | 1 |

As above the plasticized poly(vinyl chloride) formulations were compression molded, milled, and tested, as presented in the following table.

TABLE II

| | |
|---|---|
| Durometer ASTM D-1706 instant, 10 sec. | 88;81 |
| Tensile break p.s.i., ASTM D-412 | 2747 |
| Elongation break, percent, ASTM D-412 | 352 |
| 100% modulus p.s.i., ASTM D-412 | 1470 |

The above example demonstrates tetrahydropyranyl derivatives of aryl compounds exemplified by 4-phenyltetrahydropyran to be useful as secondary plasticizers for organic polymers exemplified by poly(vinyl chloride).

We claim:
1. Aryltetrahydropyran compounds comprising a tetrahydropyranyl radical chemically bonded through a carbon-to-carbon single bond to an aryl radical;
said tetrahydropyranyl radical having the formula

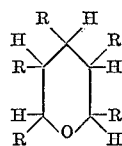

wherein four of the R substituents are selected from the group consisting of hydrogen, an alkyl radical having up to and including 17 carbon atoms, or a cycloalkyl radical having up to and including 12 carbon atoms and the total number of carbon atoms of the alkyl and cycloalkyl radicals of said R substituents does not exceed 20 carbon atoms per tetrahydropyranyl radical;
wherein the fifth of said R substituents represents a carbon-carbon single bond through which said tetrahydropyranyl radical is chemically bonded to said aryl radical;
said aryl radical having the formula

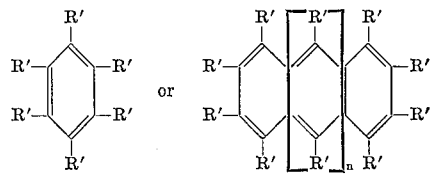

wherein one R' substituent represents a carbon-carbon single bond through which said aryl radical is chemically bonded to said tetrahydropyranyl radical to form said aryltetrahydropyran compound;
wherein the remaining R' substituents are selected from the group consisting of hydrogen, an alkyl radical having up to and including 12 carbon atoms, a cycloalkyl radical having up to and including 12 carbon atoms, phenyl, benzyl or pinanyl; and
wherein from 1 to 3 of said R' groups are selected from the group consisting of alkyl, cycloalkyl, phenyl, benzyl or pinanyl radicals, as previously defined, and $n$ is 0, 1 or 2.

2. A compound according to claim 1 wherein four R substituents of the tetrahydropyranyl radical are hydrogen.

3. A compound according to claim 2 wherein said aryl radical is

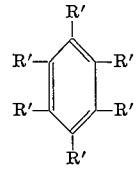

4. A compound according to claim 3 wherein one R' substituent of said aryl radical is an alkyl radical having up to 12 carbon atoms, and four R' substituents are hydrogen.

5. A compound according to claim 4 wherein said aryl radical is p-tolyl.

References Cited

UNITED STATES PATENTS

| | | | |
|---|---|---|---|
| 1,551,095 | 8/1925 | Fritzsche et al. | 260—248 |
| 1,566,742 | 12/1925 | Fritzsche et al. | 260—248 |
| 2,325,803 | 8/1943 | Schmidt et al. | 260—248 |

OTHER REFERENCES

Surrey, "Name Reactions in Organic Chemistry," Academic Press Inc., Pub., New York (1954) pp. 2-4.

JOHN M. FORD, Primary Examiner

U.S. Cl. X.R.

260—30.4, 999; 71—93